United States Patent
Shinagawa et al.

(10) Patent No.: US 11,707,795 B2
(45) Date of Patent: Jul. 25, 2023

(54) WELDING APPARATUS AND PLATE THICKNESS TESTING METHOD FOR WELDING APPARATUS

(71) Applicant: KEYLEX CORPORATION, Hiroshima (JP)

(72) Inventors: Ryotaro Shinagawa, Hiroshima (JP); Tadayoshi Takeuchi, Hiroshima (JP)

(73) Assignee: KEYLEX CORPORATION, Hiroshima (JP)

( * ) Notice: Subject to any disclaimer, the term of this patent is extended or adjusted under 35 U.S.C. 154(b) by 255 days.

(21) Appl. No.: 17/154,180

(22) Filed: Jan. 21, 2021

(65) Prior Publication Data
US 2022/0226925 A1 Jul. 21, 2022

(51) Int. Cl.
*B23K 11/25* (2006.01)
*B23K 37/04* (2006.01)
*B23K 37/02* (2006.01)
*B23K 11/11* (2006.01)

(52) U.S. Cl.
CPC .......... *B23K 11/253* (2013.01); *B23K 11/115* (2013.01); *B23K 37/0258* (2013.01); *B23K 37/0408* (2013.01)

(58) Field of Classification Search
CPC . B23K 11/115; B23K 11/253; B23K 37/0258; B23K 37/0408

USPC ....................................................... 219/91.2
See application file for complete search history.

(56) References Cited

U.S. PATENT DOCUMENTS

| | | | |
|---|---|---|---|
| 2011/0120978 A1* | 5/2011 | Takahashi | B23K 11/253 219/86.25 |
| 2021/0053142 A1* | 2/2021 | Nawahara | B23K 11/115 |

FOREIGN PATENT DOCUMENTS

JP        2002-035951 A        2/2002

* cited by examiner

*Primary Examiner* — Dana Ross
*Assistant Examiner* — James F Sims, III
(74) *Attorney, Agent, or Firm* — Alston & Bird LLP (57) ABSTRACT

A plate thickness test mechanism includes a detection section that detects an abnormality when a plate thickness is thinner than a desired plate thickness by a predetermined amount or more or thicker than the desired plate thickness by the predetermined amount or more, a determination section that determines whether or not the detection section functions normally, and a plate-shaped test jig that has a first plate portion having a plate thickness thinner than a predetermined specific plate thickness, and a second plate portion having a plate thickness thicker than the specific plate thickness. The determination section determines whether or not a plate thickness test is normally performed on the basis of a detection result of the detection section obtained when the detection section tests the plate thicknesses of the first and second plate portions by taking the desired plate thickness as the specific plate thickness.

5 Claims, 6 Drawing Sheets

FIG.8

WELDING APPARATUS AND PLATE THICKNESS TESTING METHOD FOR WELDING APPARATUS

BACKGROUND

A technique disclosed herein belongs to the technical field that relates to a welding apparatus and a plate thickness testing method for the welding apparatus.

Conventionally, a welding apparatus including a servo gun having a fixed electrode and a movable electrode has been known (for example, Patent Document 1). In this welding apparatus, a distance between the electrodes is one factor for, e.g., determining welding conditions. Thus, many of the welding apparatuses have a function of measuring the distance between the electrodes.

For example, in a welding apparatus described in Japanese Unexamined Patent Publication No. 2002-35951, it is disclosed that, in a spot welding apparatus including a spot welding gun having a first electrode (movable electrode) on a gun shaft side driven by a servo motor and a second electrode (fixed electrode) fixed to a tip portion of a gun arm, an amount of movement of the first electrode is detected according to a detection signal of a rotary encoder that detects an amount of rotation of the servo motor, and an interval between both electrodes is detected according to the amount of movement of the first electrode.

SUMMARY

If the distance between the electrodes can be measured as in the above-mentioned conventional example, a plate thickness of an object to be welded can be measured. For example, the plate thickness of the object to be welded can be measured by the amount of movement when the movable electrode is moved until the movable electrode comes into contact with the other surface of the object to be welded while the fixed electrode is in contact with one surface of the object to be welded. If the plate thickness of the object to be welded can be measured in this way, it is possible to detect whether or not the plate thickness of the object to be welded is correct, that is, whether or not a member having a plate thickness different from that of a desired member is to be erroneously welded.

However, when the electrode is worn off by abrasion, the amount of movement of the movable electrode until the movable electrode comes into contact with the object to be welded changes, so that the plate thickness test as described above may not be performed normally.

On the other hand, for example, before actual welding operation for the object to be welded, it is conceivable to confirm whether or not the plate thickness test is normally performed by using a dummy workpiece imitating the object to be welded. However, it is necessary to prepare a dummy workpiece for each type of the objects to be welded, which increases cost and requires expansion of the working space in order to secure a storage place. In addition, it is necessary to set a test standard for each dummy workpiece, and the dummy workpiece must be put on a production line for test, which may lead to deterioration of work efficiency.

The technique disclosed herein attempts to provide a welding apparatus that can test a plate thickness of a workpiece, and in this welding apparatus, whether or not a plate thickness test is normally performed can be confirmed efficiently at low cost while reducing a working space.

A first aspect of the technique disclosed herein is directed to a welding apparatus which includes a servo gun having a fixed electrode and a movable electrode, in which the fixed electrode and the movable electrode sandwich an object to be tested to perform a plate thickness test of the object to be tested. The welding apparatus includes a gun control section that controls operation of the servo gun, a detection section that calculates a thickness of the object to be tested from an amount of movement of the movable electrode with respect to the fixed electrode and that detects an abnormality when, as an obtained calculation result, the plate thickness is thinner than a desired plate thickness by a predetermined amount or more or thicker than the desired plate thickness by the predetermined amount or more, a determination section that determines whether or not a plate thickness test of the object to be tested using the detection section is performed normally, and a plate-shaped jig that is fixed to a jig fixing position in a space and has a first plate portion having a plate thickness thinner than a predetermined specific plate thickness by the predetermined amount or more, and a second plate portion having a plate thickness thicker than the specific plate thickness by the predetermined amount or more. The gun control section is configured to operate the servo gun when determination is performed by the determination section and measure the plate thickness of the first plate portion and the plate thickness of the second plate portion, if the detection section tests the plate thicknesses of the first and second plate portions by taking a desired plate thickness as the specific plate thickness and detects abnormalities in both tests, the determination section determines that the plate thickness test is performed normally, and if the detection section does not detect an abnormality in at least one of the tests, the determination section determines that the plate thickness test is defective.

A second aspect of the technique disclosed herein is the above-described first aspect in which the jig further has a reference plate portion whose plate thickness is set to the specific plate thickness.

A third aspect of the technique disclosed herein is the above-described first or second aspect in which the welding apparatus further includes a robot which has a plurality of arms and to which the servo gun is attached, and a robot control section that controls operation of the robot. In the jig, a surface on one side of two surfaces in a plate thickness direction is a flat surface, a step is formed on a surface on the other side, at least the first plate portion and the second plate portion are formed, the jig is fixed so that the plate thickness direction is a horizontal direction or a vertical direction. At least when a production line is not operated, the robot control section operates the robot so that the servo gun is positioned at a predetermined standby position, and when the plate thicknesses of the first plate portion and the second plate portion are measured, the robot control section operates the robot to move the servo gun from the standby position to the jig fixing position so that the fixed electrode is positioned on the one side in the plate thickness direction.

A fourth aspect of the technique disclosed herein is that the jig has a Rockwell hardness HRC of 60 or more.

The technique disclosed herein also covers a plate thickness testing method for a welding apparatus. Specifically, a fifth aspect of the technique disclosed herein is directed to a plate thickness testing method for a welding apparatus including a servo gun having a fixed electrode and a movable electrode which sandwich an object to be tested to perform a plate thickness test of the object to be tested. The welding apparatus further includes a plate-shaped jig that is fixed to a jig fixing position in a space and has a first plate portion having a plate thickness thinner than a predetermined specific plate thickness by a predetermined amount or more, and a second plate portion having a plate thickness thicker than the specific plate thickness by the predetermined amount or more. The plate thickness testing method for the welding apparatus includes a determination step of determining whether or not the plate thickness test using the welding apparatus is performed normally, the determination step including: a first measurement step of sandwiching the first plate portion between the fixed electrode and the movable electrode and measuring the plate thickness of the first plate portion, a first detection step of detecting an abnormality of the plate thickness based on a measurement result in the first measurement step, a second measurement step of sandwiching the second plate portion between the fixed electrode and the movable electrode and measuring the plate thickness of the second plate portion, and a second detection step of detecting an abnormality of the plate thickness based on a measurement result in the second measurement step. The first and second detection steps are steps of detecting an abnormality when the plate thickness is thinner than the specific plate thickness by a predetermined amount or more or thicker than the specific plate thickness by the predetermined amount or more, and in the determination step, if abnormalities are detected in both the first and second detection steps, it is determined that the plate thickness test is performed normally, and if an abnormality is not detected in at least one of the first and second detection steps, it is determined that the plate thickness test is defective.

According to the above-described first and fifth aspects, it is possible to confirm whether or not the plate thickness test using the detection section is normally performed only by testing the plate thickness of the plate-shaped jig fixed to the jig fixing position, so that deterioration of work efficiency can be reduced. In particular, since the same jig is used, it is not necessary to change the test standard, so that improvement in work efficiency can be expected.

Since whether or not the plate thickness test is normally performed is determined by measuring both the first plate portion having a plate thickness thinner than the specific plate thickness by the predetermined amount or more, and the second plate portion having a plate thickness thicker than the specific plate thickness by the predetermined amount or more, the plate thickness test can be confirmed both when the plate thickness is thin and when the plate thickness is thick. Thus, high determination accuracy can be obtained.

Unlike conventional cases, it is not necessary to prepare a large number of dummy workpieces, and it suffices to provide one plate-shaped jig, so that the working space can be reduced, and the cost can also be reduced.

According to the second aspect, when there is a problem in the detection section, calibration can be performed using the measurement result of the reference plate portion. If the plate thickness of the reference plate portion is also measured, the determination accuracy according to the determination section can be further improved.

According to the third aspect, if the jig is disposed so that the plate thickness direction is the horizontal direction, the horizontal coordinates of the fixed electrode are constant when both electrodes of the servo gun sandwich the jig. On the other hand, if the jig is disposed so that the plate thickness direction is the vertical direction, the vertical coordinates of the fixed electrode are constant when both electrodes of the servo gun sandwich the jig. Thus, operation of the robot can be simplified. Consequently, the work efficiency of test can be further improved.

In addition, if the coordinates of the fixed electrode are constant when both electrodes of the servo gun sandwich the jig, for example, when the coordinates of the servo gun are deviated due to rattling of the robot, the deviation of the coordinates can be confirmed by confirming the position of the fixed electrode when the jig is sandwiched. It is also possible to confirm whether or not a position of a workpiece W or the like is deviated on the basis of the position of the jig.

According to the fourth aspect, the jig is hardly deformed even if the jig is sandwiched between both electrodes of the servo gun a plurality of times. Thus, problems of the determination based on the deformation of the jig can be reduced, and the determination accuracy according to the determination section can be further improved.

DETAILED DESCRIPTION

An embodiment of the present invention will now be described in detail with reference to the drawings. The following explanations of a preferred embodiment are substantially mere examples.

<Overall Configuration>

Figure 1:
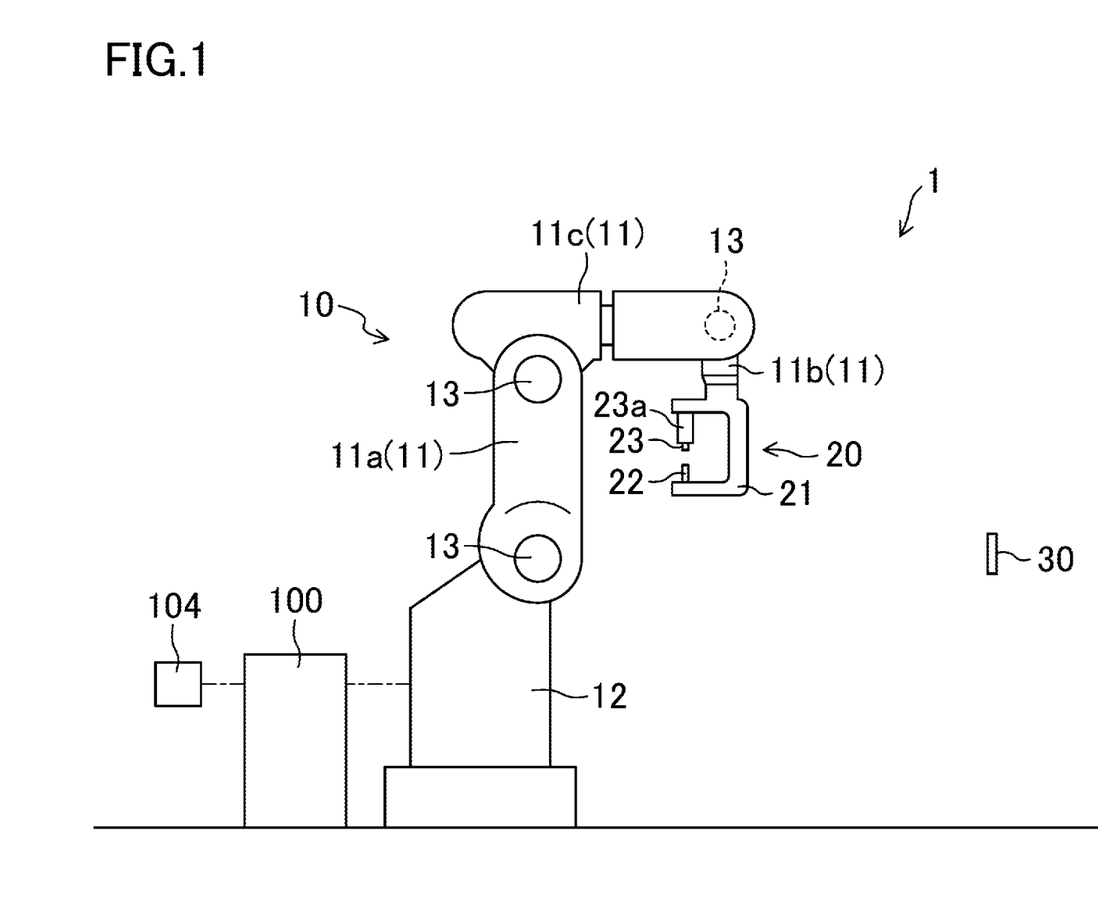
FIG. 1 is a view schematically showing a welding apparatus according to an exemplary embodiment.

FIG. 1 schematically shows a welding apparatus 1 according to the embodiment of the present invention. The welding apparatus 1 is provided on a production line. The welding apparatus 1 is a spot welding apparatus configured to perform spot welding on a workpiece W (see FIG. 3, etc.) formed by stacking a plurality of plate-shaped members and join the plate-shaped members to each other.

As shown in FIG. 1, the welding apparatus 1 includes a robot 10 having a displaceable arm 11, a servo gun 20, and a controller 100 that controls operation of the robot 10 and the servo gun 20. As will be described in detail later, the welding apparatus 1 of the present embodiment has a test jig 30 fixed at a predetermined jig fixing position.

The robot 10 is an articulated industrial robot having three arms 11 rotatably connected to each other and a base 12. The three arms 11 include a base-side arm 11*a* whose base end is connected to the base 12, a gun-side arm 11*b* in which the servo gun 20 is held at the tip, and an intermediate arm 11*c* that connects a tip portion of the base-side arm 11*a* and a base end side of the gun-side arm 11*b*. The base 12 is installed on a floor surface of a factory or the like. Consequently, the welding apparatus 1 is fixed to the floor surface of the factory or the like.

The base-side arm 11a is connected to the base 12 rotatably around a shaft extending in a vertical direction. When the base-side arm 11a rotates around the shaft, each of the arms 11a to 11c rotates in the horizontal direction together with the servo gun 20.

The base 12 and the base end portion of the base-side arm 11a, the tip portion of the base-side arm 11a and one longitudinal end portion of the intermediate arm 11c, and a base end portion of the gun-side arm 11b and the other longitudinal end portion of the intermediate arm 11c are each connected rotatably around a shaft 13 extending in the horizontal direction. The servo gun 20 can be moved back and forth in a direction orthogonal to both a vertical axis and the shaft 13 by rotating each of the arms 11a to 11c around the shaft 13.

Although not shown, the servo gun 20 is attached to a tip portion of the gun-side arm 11b so as to be rotatable around a shaft extending along the gun-side arm 11b.

In the following description, the extending direction of the shaft 13 is referred to as a left-right direction, and the direction orthogonal to both the vertical direction and an axial direction of the shaft 13 is referred to as a front-rear direction. In the front-rear direction, a side where the servo gun 20 is away from the base 12 is referred to as a front side, and a side where the servo gun 20 approaches the base 12 is referred to as a rear side.

The servo gun 20 has a U-shaped gun arm 21, a fixed electrode 22 provided at one of two tips of the gun arm 21, a movable electrode 23 that is provided at the other tip of the gun arm 21 so as to face the fixed electrode 22 and can be connected to or disconnected from the fixed electrode 22 by a servo motor 25 (see FIG. 2), and a voltage application circuit 26 (see FIG. 2) that applies a voltage between the fixed electrode 22 and the movable electrode 23. The movable electrode 23 is provided so as to project from a tip of an electrode case 23a. The servo gun 20 also has a torque sensor 24 (see FIG. 2). The torque sensor 24 detects a load (torque) applied to the servo motor 25 when the workpiece is sandwiched between the fixed electrode 22 and the movable electrode 23.

When the workpiece W (see, e.g., FIG. 4) is joined, the welding apparatus 1 sandwiches the workpiece W between the fixed electrode 22 and the movable electrode 23. After that, the welding apparatus 1 applies an electric current between both the electrodes 22 and 23 to join the plate-shaped members constituting the workpiece W. The operation of the servo gun 20 when the workpiece W is sandwiched will be described later.

Figure 2:
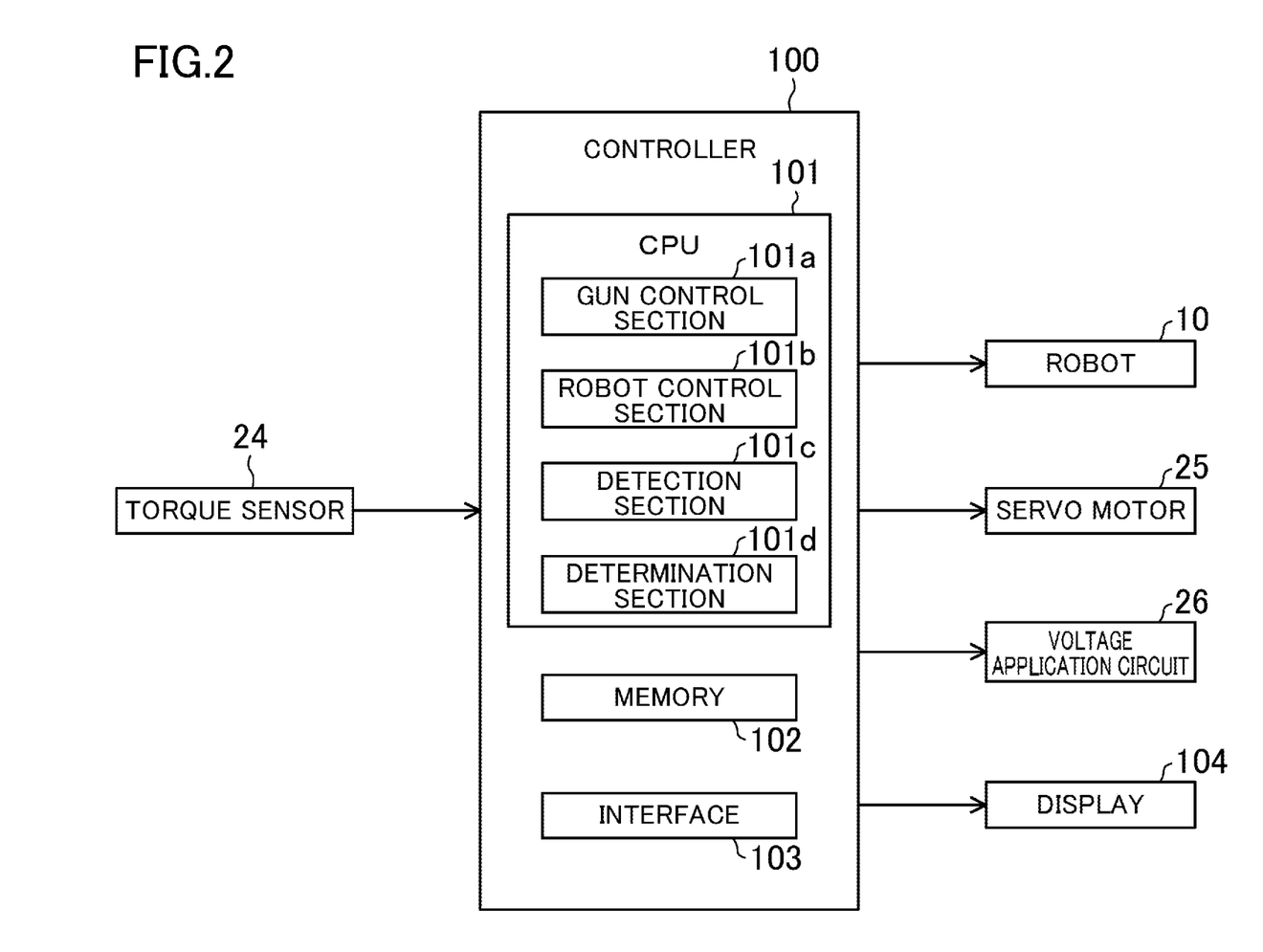
FIG. 2 is a block diagram showing a control system of the welding apparatus.

As shown in FIG. 2, the controller 100 includes a CPU 101, a memory 102, an interface 103, and a microprocessor having a path for connecting these units.

The CPU 101 constitutes a gun control section 101a that controls the operation of the servo gun 20. The CPU 101 constitutes a robot control section 101b that controls the operation of the robot 10. When the fixed electrode 22 and the movable electrode 23 sandwich an object to be tested, the CPU 101 calculates the thickness (plate thickness) of the object to be tested from an amount of movement of the movable electrode 23 with respect to the fixed electrode 22, and constitutes a detection section 101c that detects an abnormality when, as the calculation result, the plate thickness is thinner by a predetermined amount or more or thicker by the predetermined amount or more relative to a predetermined set plate thickness. The CPU 101 constitutes a determination section 101d that determines whether or not a plate thickness abnormality detection function of the detection section 101c functions normally.

The gun control section 101a of the CPU 101 controls the operation of the servo motor 25 and the voltage application circuit 26. The robot control section 101b of the CPU 101 controls the operation of each of the arms 11 of the robot 10.

The memory 102 stores a position where the servo gun 20 should be set and welding conditions (voltage to be applied between the electrodes, etc.) of the workpiece W in the welding operation for the workpiece W.

In addition to the welding apparatus 1, the controller 100 is connected to a display 104 showing a test result obtained when the thickness (plate thickness) of the object to be tested (workpiece W and the test jig 30 described later) is tested by the servo gun 20.

<Plate Thickness Test>

The welding apparatus 1 according to the present embodiment has a plate thickness test mechanism that tests the plate thickness of the workpiece W or the like. The plate-shaped members constituting the workpiece W have various plate thicknesses, and the plate thickness may differ depending on the type of the workpiece W. The plate thickness of the workpiece W as a whole may differ depending on the number of plate-shaped members stacked. Thus, by testing whether or not the plate thickness of the workpiece W to be welded has a desired plate thickness, it is possible to confirm whether or not the workpiece W different from the desired workpiece W is flowing on the production line or whether or not the plate-shaped member itself is defective.

The plate thickness test mechanism of the welding apparatus 1 according to the present embodiment measures the plate thickness of the object to be tested from the amount of movement of the movable electrode 23 when the object to be tested is sandwiched between the fixed electrode 22 and the movable electrode 23 and tests whether or not the plate thickness is a desired thickness. The operation of the servo gun 20 and the control of the controller 100 at this time will be described with reference to FIGS. 3 to 5.

Figure 3:
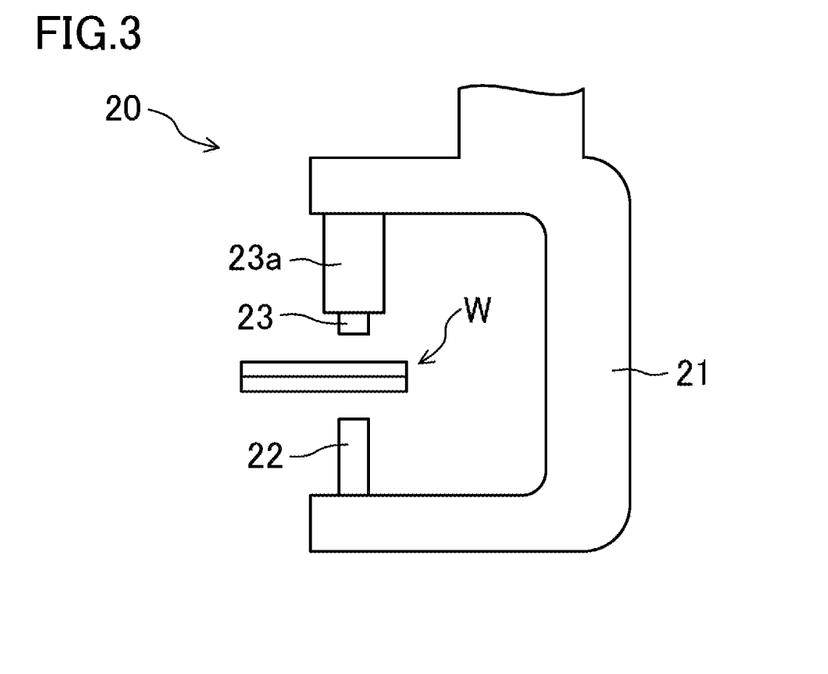
FIG. 3 is an operation diagram showing operation of a servo gun when a plate thickness of a workpiece is measured, and shows a state in which the servo gun is disposed so that a test jig is located between electrodes.

First, as shown in FIG. 3, the robot control section 101b of the CPU 101 operates the robot 10 so that the workpiece W is located between the fixed electrode 22 and the movable electrode 23 of the servo gun 20 to move the servo gun 20. At this time, neither the fixed electrode 22 nor the movable electrode 23 is in contact with the workpiece W.

Figure 4:
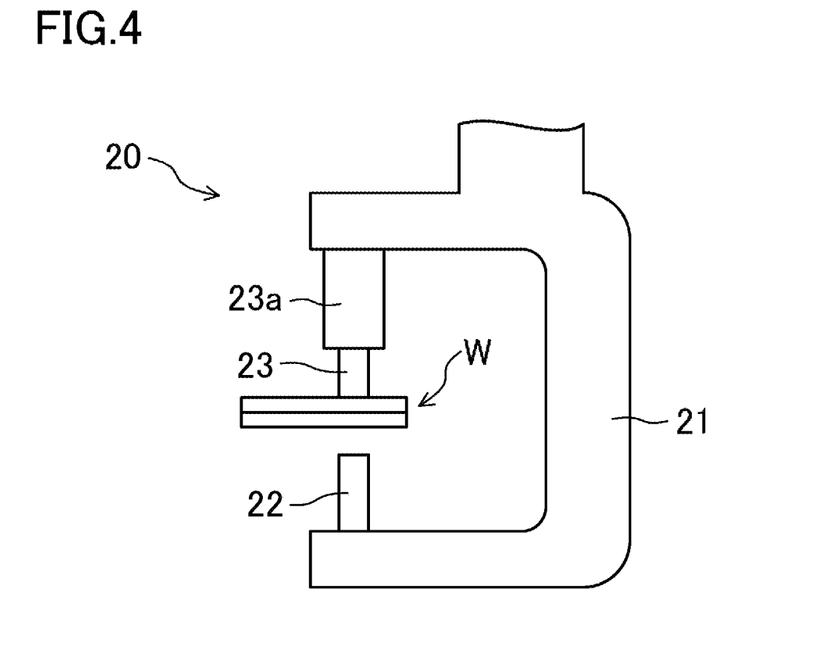
FIG. 4 is a view showing a state in which a movable electrode is displaced from the state of FIG. 3 and brought into contact with the test jig.

Next, as shown in FIG. 4, the gun control section 101a of the CPU 101 drives the servo motor 25 to move the movable electrode 23 until the movable electrode 23 is abutted against the workpiece W. Since the workpiece W is usually positioned by a positioning device or the like, the position of the movable electrode 23 itself does not change after the abutment against the workpiece W.

Figure 5:
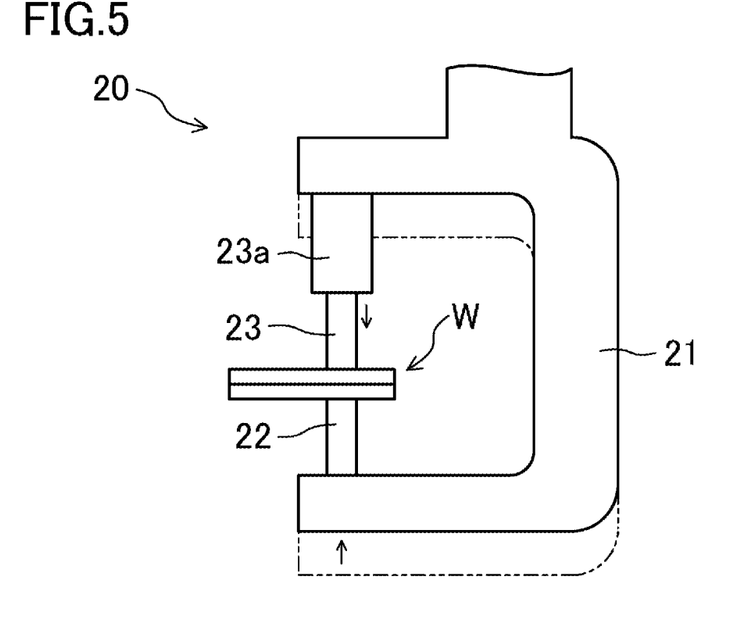
FIG. 5 is a view showing a state in which the test jig is sandwiched between a fixed electrode and the movable electrode from the state of FIG. 4.

From the state shown in FIG. 4, when the servo motor 25 is driven by the gun control section 101a of the CPU 101 so as to bring the movable electrode 23 closer to the fixed electrode 22, the reaction force moves the gun arm 21 to which the electrode case 23a is attached as shown in FIG. 5. Consequently, the workpiece W is sandwiched between the fixed electrode 22 and the movable electrode 23. At this time, although the position of the movable electrode 23 does not change, an amount of projection of the movable electrode 23 from the electrode case 23a increases, so that an amount of movement of the gun arm 21 can also be regarded as the amount of movement of the movable electrode 23. Whether or not the workpiece W is sandwiched between the fixed electrode 22 and the movable electrode 23 is determined by whether or not the torque detected by the torque sensor 24 has reached a predetermined torque. Specifically, when the torque detected by the torque sensor 24 has reached the predetermined torque, the CPU 101 determines that the workpiece W is sandwiched between the fixed electrode 22 and the movable electrode 23.

The detection section 101c of the CPU 101 calculates the amount of movement of the movable electrode 23 with respect to the fixed electrode 22, and calculates a distance between the fixed electrode 22 and the movable electrode 23 when the workpiece W is sandwiched, thereby calculating the plate thickness of the workpiece W. The amount of movement of the movable electrode 23 with respect to the fixed electrode 22 can be calculated, for example, by obtaining the number of rotations of the servo motor 25 before the workpiece W is sandwiched.

After the calculation of the plate thickness of the workpiece W, the detection section 101c of the CPU 101 detects an abnormality based on the calculated plate thickness. That is, when the plate thickness is thinner by a predetermined amount or more or thicker by the predetermined amount or more relative to a predetermined set plate thickness, the detection section 101c detects an abnormality. When the detection section 101c detects an abnormality, the controller 100 stops the welding operation, for example, and displays on the display 104 that the abnormality has been detected. The set plate thickness and the predetermined amount can be different for each of the workpiece W, and can be arbitrarily set by an operator.

As described above, by providing the plate thickness test mechanism in the welding apparatus 1, when plate-shaped members having an incorrect plate thickness are overlapped, or when the plate thickness is thin or thick due to a defect of the plate-shaped member itself, the operator can confirm this fact. Consequently, it is possible to prevent or reduce defective products from being manufactured in advance.

However, since both the electrodes 22 and 23 of the servo gun 20 are worn, the amount of movement of the movable electrode 23 cannot be calculated accurately due to the wear. Thus, for example, even when the plate thickness of the workpiece W is thicker than the set plate thickness by the predetermined amount or more, the detection section 101c does not detect an abnormality, and the plate thickness test using the detection section 101c is not normally performed. Even if the gun arm 21 deflects when the workpiece W is sandwiched between both the electrodes 22 and 23, the amount of movement of the movable electrode 23 cannot be calculated accurately, so that there is a risk that the above-described plate thickness test may not be performed normally.

Although it is possible to measure and correct amounts of wear of both the electrodes 22 and 23, if a correction value at this time is not accurate, the above-described plate thickness test is not performed normally after all.

Thus, in the welding apparatus 1 according to the present embodiment, before the workpiece W is put on the production line, whether or not the plate thickness test using the detection section 101c is performed normally is determined using the test jig 30 by the determination section 101d of the CPU 101.

Figure 6:
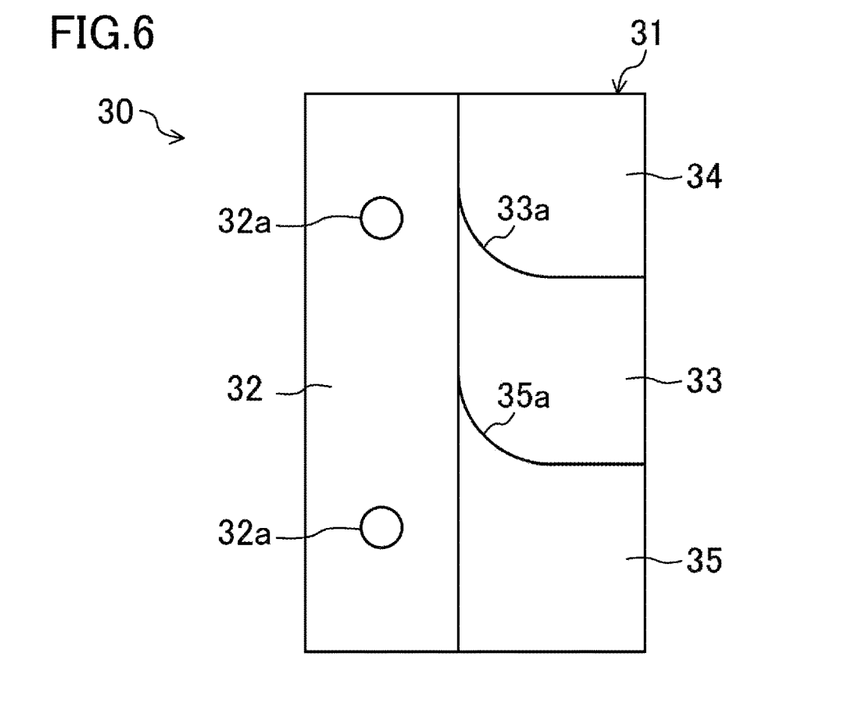
FIG. 6 is a front view of the test jig.
Figure 7:
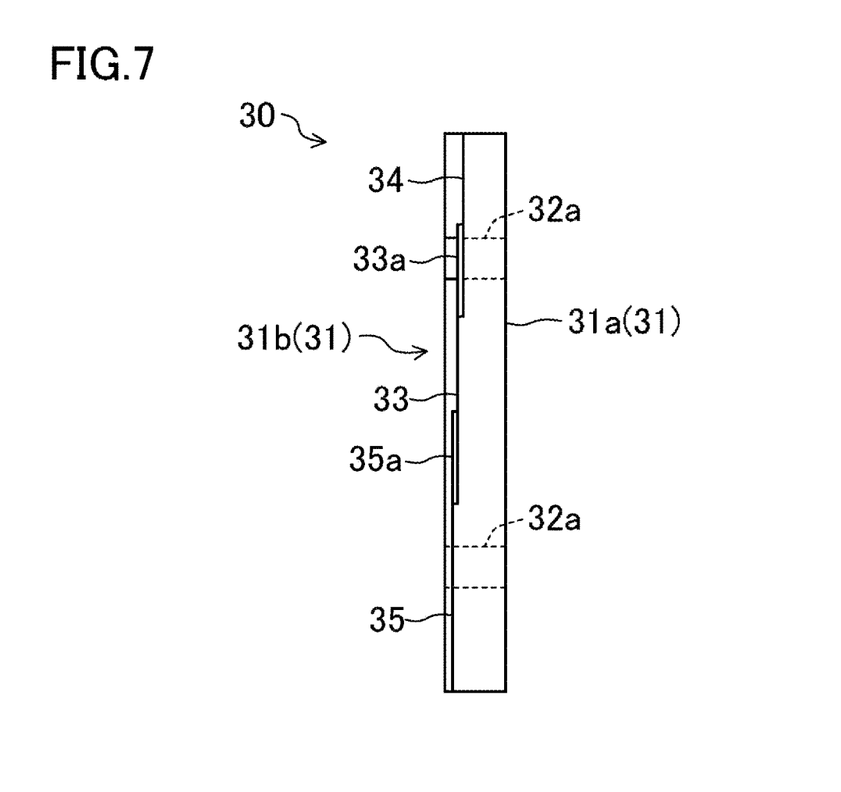
FIG. 7 is a side view of the test jig.

As shown in FIGS. 6 and 7, the test jig 30 is formed by processing a rectangular metal plate so that portions having different plate thicknesses are formed. In the metal plate constituting the test jig 30, the material and thickness are set so that the metal plate is not displaced or deformed even if the metal plate is sandwiched between both the electrodes 22 and 23. In the present embodiment, the test jig 30 is a metal plate having a Rockwell hardness HRC of 60 or more. Specifically, for example, a JIS standard high-speed tool steel (SKH) may be quenched so that the Rockwell hardness after quenching is HRC60 to 66. As a material of the test jig 30, carbon tool steel (SK) or carbon steel for machine structure (SXXC) may be used.

In the test jig 30, as shown in FIG. 6, a test portion 31 is formed in about half of one side in a short side direction, and a fixing portion 32 fixed at the jig fixing position is formed in half of the other side in the short side direction. The test portion 31 and the fixing portion 32 each extend in the long side direction without changing the width in the short side direction.

The test portion 31 has a reference plate portion 33 having a predetermined specific plate thickness, a first plate portion 34 having a plate thickness thinner than the specific plate thickness by the predetermined amount or more, and a second plate portion 35 having a plate thickness thicker than the specific plate thickness by the predetermined amount or more. The reference plate portion 33 is formed at the center in the long side direction, the first plate portion 34 is formed on one side in the long side direction with respect to the reference plate portion 33, and the second plate portion 35 is formed on the other side in the long side direction with respect to the reference plate portion 33. Consequently, as shown in FIG. 7, the test portion 31 has a shape in which the plate thickness gradually increases from the one side in the long side direction to the other side. In the test portion 31, as shown in FIG. 7, a surface on one side (hereinafter referred to as a flat surface 31a) of two surfaces in a plate thickness direction is a flat surface, and, on the other hand, a step is formed on a surface on the other side (hereinafter referred to as a step surface 31b), so that the reference plate portion 33, the first plate portion 34, and the second plate portion 35 are formed.

A portion of the reference plate portion 33 on one side in the long side direction and on the other side in the short side direction is a curved portion 33a that is curved and inclined to the one side in the long side direction toward the other side in the short side direction. Also in the second plate portion 35, similarly to the reference plate portion 33, a portion on one side in the long side direction and on the other side in the short side direction is a curved portion 35a that is curved and inclined to the one side in the long side direction toward the other side in the short side direction. The curved portions 33a and 35a do not necessarily have to be provided.

Figure 8:
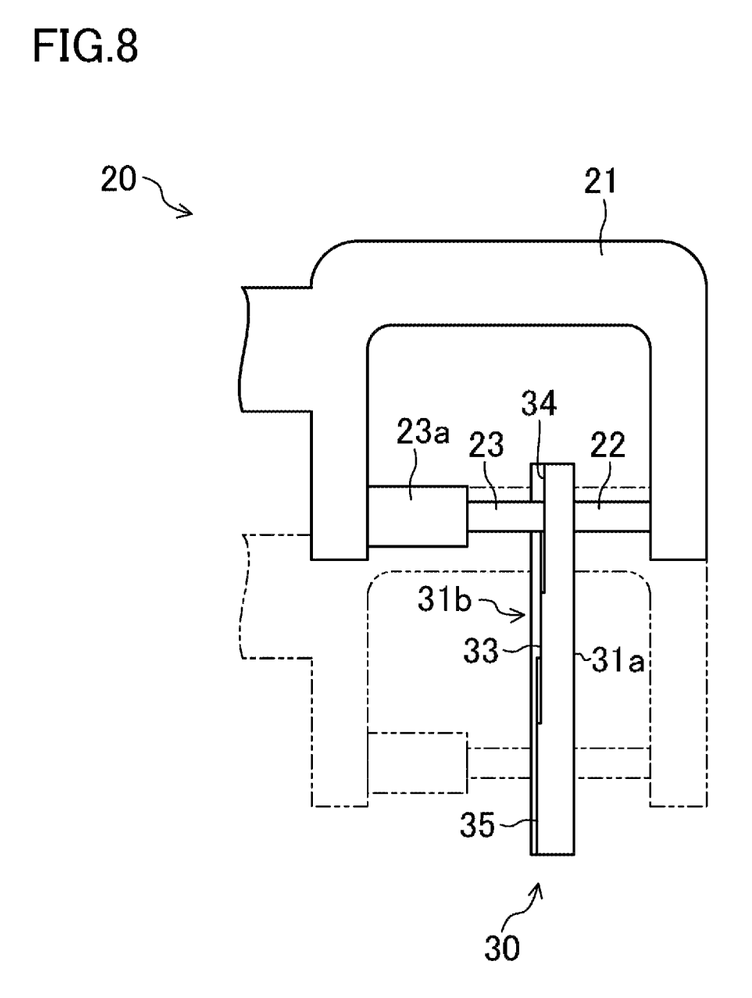
FIG. 8 is a view showing a state in which the test jig is sandwiched between the fixed electrode and the movable electrode when a plate thickness of the test jig is measured.

The fixing portion 32 is provided with two bolt holes 32a into which bolts are inserted. Although detailed illustration is omitted, the test jig 30 is fixed to the jig fixing position by fastening and fixing the fixing portion 32 to a support portion, provided at the jig fixing position in a working space of the welding apparatus 1, with a fastener such as a bolt. In the present embodiment, as shown in FIGS. 1 and 8, the test jig 30 is fixed to the jig fixing position so that the plate thickness direction is the front-rear direction (horizontal direction) and the long side direction is the vertical direction.

Next, an operation of the welding apparatus 1 when the determination section 101d makes a determination using the test jig 30 will be described. When the determination section 101d makes a determination using the test jig 30, the set plate thickness that serves as a detection reference for the detection section 101c is predetermined to the specific plate thickness. The determination by the determination section 101d using the test jig 30 is automatically executed at least immediately after the production line is put into operation and before the workpiece W is put on the production line.

First, when the production line is not operated immediately before the production line is operated, as shown in FIG. 1, the robot control section 101b operates the robot 10 so that the servo gun 20 is positioned at a predetermined standby position. When the production line is operated from this state, in order to measure the plate thickness of the test jig 30, the robot control section 101b operates the robot 10 so that the servo gun 20 is moved from the standby position to the jig fixing position. At this time, as shown in FIG. 8, the robot control section 101b operates the robot 10 so that while the fixed electrode 22 of the servo gun 20 is located on the flat surface 31a side of the test jig 30, the movable electrode 23 of the servo gun 20 is located on the step surface 31b side of the test jig 30.

Next, the gun control section 101a operates the servo gun 20 to test the plate thickness of the test jig 30. In the present embodiment, at least the plate thicknesses of the first plate portion 34 and the second plate portion 35 are tested in the determination by the determination section 101d. The gun control section 101a operates the servo gun 20 in the same manner as when the workpiece W is sandwiched, and, as shown in FIG. 8, the servo gun 20 sequentially sandwiches the first plate portion 34 and the second plate portion 35. The detection section 101c calculates each of the plate thicknesses of the first plate portion 34 and the second plate portion 35.

As described above, in the determination by the determination section 101d, the set plate thickness is set to the specific plate thickness. Thus, if the detection section 101c functions normally, the detection section 101c detects abnormalities in both the test of the first plate portion 34 thinner than the specific plate thickness by the predetermined amount or more and the test of the second plate portion 35 thicker than the specific plate thickness by the predetermined amount or more. Thus, when the plate thicknesses of the first plate portion 34 and the second plate portion 35 are tested, the determination section 101d determines that the plate thickness test using the detection section 101c is performed normally when the detection section 101c detects an abnormality in each test. On the other hand, the determination section 101d determines that the plate thickness test is defective when the detection section 101c does not detect an abnormality in at least one measurement. Consequently, the determination by the determination section 101d using the test jig 30 is completed.

When the determination section 101d determines that the plate thickness test is defective, the CPU 101 notifies the operator that the plate thickness test is defective by, e.g., an alarm or a display on the display 104. After the defect is transmitted, the operator investigates causes such as whether the defect of the plate thickness test occurs due to wear of both the electrodes 22 and 23, whether the defect occurs due to abnormal deflection of the gun arm 21, or whether the correction value of wear correction is incorrect when the wear correction is performed, and operation (calibration) that eliminates the defect of the plate thickness test may be performed. At this time, the operator may cause, for example, the robot 10 and the servo gun 20 to measure the plate thickness of the reference plate portion 33 and may perform calibration on the basis of the measurement result.

Therefore, according to the present embodiment, the detection section 101c of the CPU 101 that calculates the thickness of the object to be tested from the amount of movement of the movable electrode 23 with respect to the fixed electrode 22 and detects an abnormality when, as the calculation result, the plate thickness is thinner by a predetermined amount or more or thicker by the predetermined amount or more relative to a desired plate thickness, the determination section 101d of the CPU 101 that determines whether or not the plate thickness test using the detection section 101c is performed normally, and the plate-shaped test jig 30 fixed to the jig fixing position in the space and having the first plate portion 34 having a plate thickness thinner than a predetermined specific plate thickness by the predetermined amount or more, and the second plate portion 35 having a plate thickness thicker than the specific plate thickness by the predetermined amount or more are provided. When the detection section 101c tests the plate thicknesses of the first and second plate portions 34 and 35 by taking a desired plate thickness as the specific plate thickness and detects abnormalities in both the tests, the determination section 101d determines that the plate thickness test is performed normally. On the other hand, when the detection section 101c does not detect an abnormality in at least one of the tests, the determination section 101d determines that the plate thickness test is defective. Consequently, it is possible to confirm whether or not the above-described plate thickness test is normally performed only by testing the plate thickness of the test jig 30 fixed to the jig fixing position, so that deterioration of work efficiency can be reduced. In particular, unlike conventional cases, since it is not necessary to change the test standard for each dummy workpiece, improvement in work efficiency can be expected.

Since whether or not the plate thickness test is normally performed is determined by measuring both the first plate portion 34 having a plate thickness thinner than the specific plate thickness by the predetermined amount or more, and the second plate portion 35 having a plate thickness thicker than the specific plate thickness by the predetermined amount or more, the plate thickness test can be confirmed both when the plate thickness is thin and when the plate thickness is thick. Thus, high determination accuracy can be obtained.

Unlike conventional cases, it is not necessary to prepare a large number of dummy workpieces, and it suffices to provide one test jig 30, so that the working space can be reduced, and the cost can also be reduced.

In the present embodiment, the test jig 30 is fixed to the jig fixing position so that the plate thickness direction is the front-rear direction (horizontal direction) and the long side direction is the vertical direction, and the robot control section 101b of the CPU 101 moves the servo gun 20 from the standby position to the jig fixing position so that the fixed electrode 22 is located on the flat surface 31a side. Consequently, when both the electrodes 22 and 23 of the servo gun 20 sandwich the test jig 30, the horizontal coordinates of the fixed electrode 22 are constant. Thus, operation of the robot 10 can be simplified. Consequently, it is possible to more efficiently determine whether or not the plate thickness test is performed normally.

In addition, suppose that the horizontal coordinates of the fixed electrode 22 are constant when both the electrodes 22 and 23 of the servo gun 20 sandwich the test jig 30. In such a situation, for example, if the coordinates of the servo gun 20 are deviated due to rattling of the robot 10, the deviation of the coordinates can be confirmed by confirming the position of the fixed electrode 22 when the test jig 30 is sandwiched. It is also possible to confirm whether or not the position of the workpiece W or the like is deviated on the basis of the position of the test jig 30.

In the present embodiment, the test jig 30 has a Rockwell hardness HRC of 60 or more. Thus, the test jig 30 is hardly deformed even if the test jig 30 is sandwiched between both the electrodes 22 and 23 of the servo gun 20 a plurality of times. Thus, problems of the determination based on the deformation of the test jig 30 can be reduced, and the accuracy of the determination whether or not the plate thickness test is normally performed can be further improved.

The technique disclosed herein should not be limited to the foregoing embodiments, and various changes and modifications may be made without departing from the scope of the claims.

For example, in the above embodiment, in the determination by the determination section 101d using the test jig 30, the first plate portion 34 and the second plate portion 35 are the test targets. However, the present invention is not limited to this embodiment, and the reference plate portion 33 may also be a test target. When the plate thickness of the reference plate portion 33 is tested, the determination section 101d determines that the plate thickness test using the detection section 101c is normally performed when the detection section 101c does not detect an abnormality. On the other hand, when the detection section 101c detects an abnormality, the determination section 101d determines that a defect has occurred in the plate thickness test.

Further, in the above embodiment, the test jig 30 is fixed to the jig fixing position so that the plate thickness direction is the front-rear direction and the long side direction is the vertical direction. However, the present invention is not limited to this embodiment, and the test jig 30 may be disposed so that the plate thickness direction is the vertical direction and the long side direction is the front-rear direction.

Furthermore, in the above embodiment, the determination by the determination section 101d using the test jig 30 is executed immediately after the production line is operated. However, in addition to this embodiment, the operator may execute the determination at any timing.

The embodiment described above is provided by way of illustration only and should not be construed to limit the present disclosure. The scope of the present disclosure should be measured solely by reference to the claims. All the modifications and changes within an equivalent scope of the claims fall within the scope of the present disclosure.

What is claimed is:

1. A welding apparatus comprising:
   a servo gun having a fixed electrode and a movable electrode, the fixed electrode and the movable electrode adapted to sandwich an object to be tested to perform a plate thickness test;
   the object to be tested comprising a plate-shaped jig, the object being different from a workpiece, fixed to a jig fixing position in a space, and comprising a first plate portion having a first plate thickness and a second plate portion having a second plate thickness that is thicker than the first plate portion; and
   a processor adapted to:
      calculate a thickness of the first plate portion from an amount of movement of the movable electrode with respect to the fixed electrode and detect an abnormality when, as an obtained calculation result, the first plate thickness is thinner than a desired plate thickness by a predetermined amount or more,
      calculate a thickness of the second plate portion from an amount of movement of the movable electrode with respect to the fixed electrode and detect an abnormality when, as an obtained calculation result, the second plate thickness is thicker than a desired plate thickness by a predetermined amount or more,
      determine, based on the calculation results, that the plate thickness test is abnormal if an abnormality is not detected for at least one of the calculation of the first plate portion and the calculation of the second plate portion,
      determine, based on the calculation results, that the plate thickness test is normal if an abnormality is detected for both the calculation of the first plate portion and the calculation of the second plate portion,
      operate the servo gun if the determination is that the plate thickness test is normal.

2. The welding apparatus of claim 1, wherein the jig further comprises a reference plate portion whose plate thickness is set to the specific plate thickness.

3. The welding apparatus of claim 1, further comprising:
   a robot which has a plurality of arms and to which the servo gun is attached; and
   the processor adapted to control operation of the robot, wherein
   in the jig, a surface on one side of two surfaces in a plate thickness direction is a flat surface, a step is formed on a surface on the other side, at least the first plate portion and the second plate portion are formed, the jig is fixed so that the plate thickness direction is a horizontal direction or a vertical direction, and
   at least when a production line is not operated, the processor operates the robot so that the servo gun is positioned at a predetermined standby position, and when the plate thicknesses of the first plate portion and the second plate portion are measured, the processor operates the robot to move the servo gun from the standby position to the jig fixing position so that the fixed electrode is positioned on the one side in the plate thickness direction.

4. The welding apparatus of claim 1, wherein
the jig has a Rockwell hardness HRC of 60 or more.

5. A method of determining whether or not a plate thickness testing using a welding apparatus is performed normally, the welding apparatus comprising a processor, a servo gun having a fixed electrode and a movable electrode adapted to sandwich an object to be tested to perform a plate thickness test, the servo gun being configured to weld a workpiece using an electric current applied between the fixed electrode and the movable electrode, the welding apparatus further including a plate-shaped test jig that is different from the workpiece, fixed to a jig fixing position in a space and has a first plate portion having a first plate thickness and a second plate portion having a second plate thickness that is thicker than the first plate portion, the method comprising:
   calculating a thickness of the first plate portion from an amount of movement of the movable electrode with respect to the fixed electrode and detecting an abnormality when, as an obtained calculation result, the first plate thickness is thinner than a desired plate thickness by a predetermined amount or more,
   calculating a thickness of the second plate portion from an amount of movement of the movable electrode with respect to the fixed electrode and detecting an abnormality when, as an obtained calculation result, the second plate thickness is thicker than a desired plate thickness by a predetermined amount or more,
   determining, based on the calculation results, that the plate thickness test is abnormal if an abnormality is not detected for at least one of the calculation of the first plate portion and the calculation of the second plate portion,
   determining, based on the calculation results, that the plate thickness test is normal if an abnormality is detected for both the calculation of the first plate portion and the calculation of the second plate portion, operating the servo gun if the determination is that the plate thickness test is normal.

\* \* \* \* \*